United States Patent
DiGasbarro

(10) Patent No.: US 8,591,299 B2
(45) Date of Patent: Nov. 26, 2013

(54) WINDSHIELD DE-ICING DUCT SYSTEM

(75) Inventor: Daniel Joseph DiGasbarro, Oxford, MI (US)

(73) Assignee: DENSO International America, Inc., Southfield, MI (US)

(*) Notice: Subject to any disclaimer, the term of this patent is extended or adjusted under 35 U.S.C. 154(b) by 910 days.

(21) Appl. No.: 12/751,224

(22) Filed: Mar. 31, 2010

(65) Prior Publication Data

US 2011/0244777 A1    Oct. 6, 2011

(51) Int. Cl.
*B60S 1/54*    (2006.01)
*B60S 1/02*    (2006.01)

(52) U.S. Cl.
CPC .......................... *B60S 1/54* (2013.01)
USPC ........................... 454/127; 52/171.2; 165/204

(58) Field of Classification Search
USPC ............. 454/127; 15/313; 52/717.2; 165/204; 126/621, 652
See application file for complete search history.

(56) References Cited

U.S. PATENT DOCUMENTS

| | | | | |
|---|---|---|---|---|
| 2,176,143 A | * | 10/1939 | Miller | 454/127 |
| 2,304,691 A | | 12/1942 | Hund | |
| 2,677,155 A | | 5/1954 | Wise | |
| 3,359,881 A | | 12/1967 | Lamb | |
| 4,432,341 A | * | 2/1984 | Howe et al. | 126/623 |
| 4,549,471 A | | 10/1985 | Kochy et al. | |
| 4,693,416 A | | 9/1987 | Hayakawa | |
| 5,097,563 A | | 3/1992 | Cowan | |
| 5,173,586 A | | 12/1992 | Gold | |
| 5,354,114 A | * | 10/1994 | Kelman et al. | 296/192 |
| 5,674,118 A | * | 10/1997 | Prock | 454/127 |
| 5,762,395 A | * | 6/1998 | Merrifield et al. | 296/203.01 |
| 5,987,216 A | | 11/1999 | Krug | |
| 6,163,013 A | * | 12/2000 | King et al. | 219/203 |
| 6,171,184 B1 | * | 1/2001 | Robbins | 454/122 |
| 6,382,712 B1 | * | 5/2002 | Bruss | 296/190.09 |
| 7,798,658 B2 | * | 9/2010 | Sharma | 359/507 |
| 2005/0235979 A1 | * | 10/2005 | Whittaker | 126/19.5 |
| 2008/0098759 A1 | * | 5/2008 | Kuo | 62/235.1 |
| 2011/0204037 A1 | * | 8/2011 | Seaborn | 219/203 |
| 2013/0192017 A1 | * | 8/2013 | Jacobowitz | 15/250.361 |

FOREIGN PATENT DOCUMENTS

EP    2088380 A2 *  8/2009  ............. F16L 41/03

* cited by examiner

*Primary Examiner* — Steven B McAllister
*Assistant Examiner* — Frances H Kamps
(74) *Attorney, Agent, or Firm* — Harness, Dickey & Pierce, P.L.C.

(57) ABSTRACT

An air duct system may employ an HVAC case having an exit air duct and a return air duct, a windshield with an interior surface, an approximately vertical duct, and a horizontal duct. Ducts mount to the windshield and each define an interior passageway with the interior surface of the windshield and a second, return air, passageway. The interior passageway may receive air from the exit air duct and the second passageway may return air to the return air duct. End chambers of each duct reverse air direction 180 degrees. Air of each interior passageway may warm an adjacent area of the windshield that forms part of each interior passageway and a windshield wiper. The first air duct interior passageway may warm a windshield area coincident with a maximum non-park wiper position and the second air duct interior passageway may warm a windshield area coincident with a wiper park position.

19 Claims, 3 Drawing Sheets

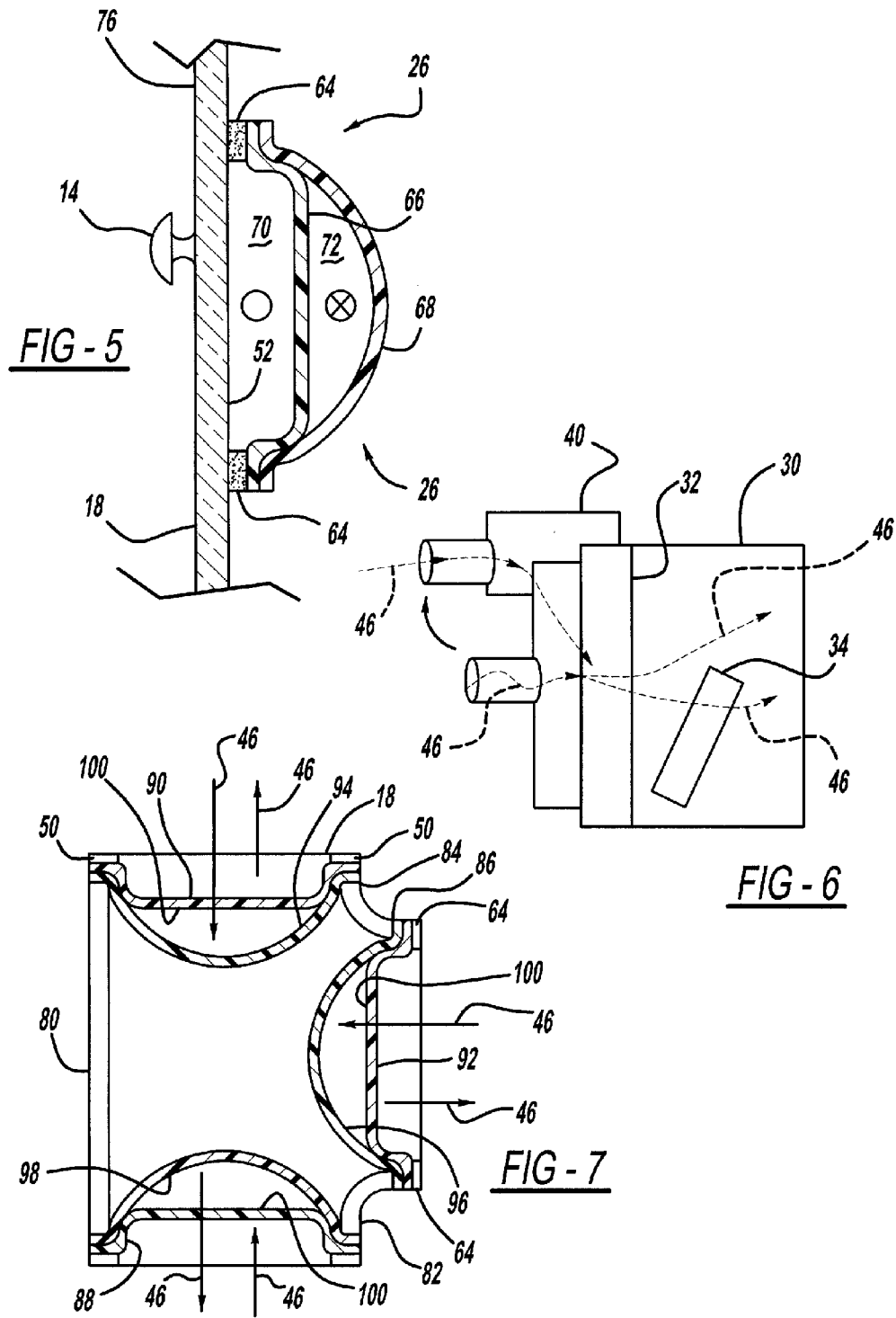

WINDSHIELD DE-ICING DUCT SYSTEM

FIELD

The present disclosure relates to a heating, ventilating and air-conditioning system and associated air ducts used to warm a windshield and wiper blades.

BACKGROUND

This section provides background information related to the present disclosure which is not necessarily prior art. Modern vehicles such as automobiles may be equipped with a windshield wiping system that to varying degrees of effectiveness, wipes water, snow, ice and other debris from an exterior surface of a windshield. However, such a system is not without its limitations for removing such snow and ice from an exterior surface of the windshield. An effective system for melting such ice and snow from specific areas of the windshield to prevent obstruction with one or more windshield wipers is needed.

SUMMARY

This section provides a general summary of the disclosure, and is not a comprehensive disclosure of its full scope or all of its features. An apparatus to warm a windshield may employ an HVAC case, unit or assembly having an exit air duct and a return air duct, a windshield having an interior surface, and an approximately vertical duct. The vertical duct may entail a first approximately vertical wall arranged next to the windshield to define an interior passageway with the interior surface of the windshield, and a second approximately vertical wall arranged next to the interior wall to define an exterior passageway with the first wall. The interior passageway may receive air from the exit air duct and the exterior passageway may deliver air to the return air duct. The approximately vertical duct may define an end chamber where flowing air reverses direction 180 degrees, or whatever angle is necessary to return air within the vertical duct. The horizontal duct, or approximately horizontal duct, may entail a first horizontal wall arranged next to the windshield and defining a horizontal, or approximately horizontal, interior passageway with the interior surface of the windshield, and an second horizontal wall arranged next to the first horizontal wall and defining an horizontal exterior passageway with the first horizontal wall, wherein the horizontal interior passageway receives air from the exit air duct and the horizontal exterior passageway delivers air to the return air duct. The horizontal duct may define an end chamber where flowing air reverses direction 180 degrees within the horizontal duct. An A-pillar, or vehicle body structure, within which the windshield may partially mount, may be parallel to or approximately parallel to the vertical duct. A heated zone of the windshield heated by the approximately vertical duct may be completely beside the A-pillar, or body component. A manifold may divide air from the HVAC case to the approximately vertical duct and the horizontal duct, and combine return air from the approximately vertical duct and the horizontal duct before the air is returned to the HVAC case, unit or assembly.

In another arrangement, an apparatus for warming a windshield may employ an HVAC case having an exit air duct and an inlet air duct, a windshield having an interior surface, an approximately vertical duct and a horizontal or approximately horizontal duct. The approximately vertical duct may employ a first approximately vertical wall arranged next to the windshield and define an interior passageway with the interior surface of the windshield, and a second approximately vertical wall arranged next to the first approximately vertical wall that may define an exterior passageway with the first wall. The interior passageway may receive air from the exit air duct and the exterior passageway may return or deliver air to the return air duct. The horizontal duct may employ a first horizontal wall arranged next to the windshield and define a horizontal interior passageway with the interior surface of the windshield. A second horizontal wall may be arranged next to the first horizontal wall and define a horizontal exterior passageway with the first horizontal wall. The horizontal interior passageway may receive air from the exit air duct and the horizontal exterior passageway may deliver air to the return air duct.

A manifold may define a vertical branch and a horizontal branch, the vertical branch may connect to the approximately vertical duct and the horizontal branch may connect to the horizontal duct. The manifold may further define a first chamber in which air moves away from the HVAC case and a second chamber in which air moves toward the HVAC case. The first chamber of the manifold may direct air into the approximately vertical duct and the horizontal duct. The approximately vertical duct may define an end chamber where flowing air reverses direction 180 degrees, and similarly, the horizontal duct may define an end chamber where flowing air reverses direction 180 degrees. The second approximately vertical wall and the first approximately vertical wall may be connected together along parallel longitudinal edges, and the second horizontal wall and the first horizontal wall are connected together along parallel longitudinal edges.

In yet another configuration, an apparatus to warm a windshield may employ an HVAC case having an exit air duct and an inlet air duct, a windshield having an interior surface, a first air duct and a second air duct. The first air duct may employ a first air duct interior longitudinal wall arranged next to the windshield and may define a first air duct first interior passageway with the interior surface of the windshield. A first air duct exterior longitudinal wall may be arranged partially against the first air duct interior longitudinal wall to define a first air duct exterior passageway. The second air duct may employ a second air duct interior longitudinal wall arranged next to the windshield to define a second air duct interior passageway with the interior surface of the windshield. A second air duct exterior longitudinal wall may be arranged in part against the second air duct interior longitudinal wall to define a second air duct exterior passageway with the second air duct interior longitudinal wall.

An air manifold may define a first chamber and a second chamber. The first chamber may direct air into the first air duct interior passageway and the second air duct interior passageway and receive air from the exit air duct. The second chamber may receive air from first air duct exterior passageway and the second air duct exterior passageway and direct the air into the inlet air duct. The first air duct may define an end chamber where flowing air reverses direction 180 degrees, and similarly, the second air duct may define an end chamber where flowing air reverses direction 180 degrees. The first air duct and the second air duct are mounted to the windshield, which may be a boundary of air ducts and a wall of a chamber of either duct where air is reversed in direction. The first air duct interior longitudinal wall and the first air duct exterior longitudinal wall may be connected together along parallel longitudinal or lengthwise edges, and the second air duct interior longitudinal wall and the second air duct exterior longitudinal wall may be connected together along parallel longitudinal or lengthwise edges. The first air duct may be located parallel to an A-pillar within which or to which the windshield may be secured. The first air duct interior passageway may warm an area of the windshield coincident with a maximum non-park position (a position of the wiper closest to the A-pillar) of a windshield wiper. The second air duct interior passageway may warm an area of the windshield coincident with or surrounding a horizontal or park position of the windshield wiper.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a cross-sectional view of an HVAC case depicting an inlet duct and HVAC case with an evaporator and heater core in accordance with the present disclosure;

FIG. 5 is a side view of how air returning to an HVAC case may be conditioned and warmed in accordance with the present teachings; and FIG. 7 is a perspective view of a manifold to distribute air to and receive air from vertical and horizontal ducts adjacent a windshield.

Corresponding reference numerals indicate corresponding parts throughout the several views of the drawings.

DETAILED DESCRIPTION

Figure 1:
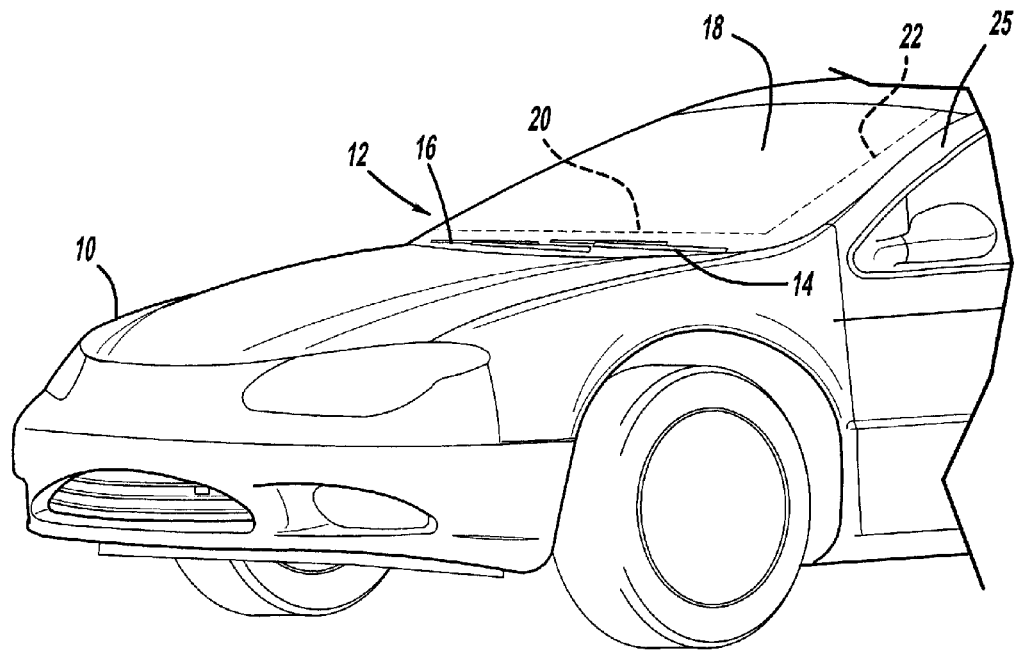
FIG. 1 is a perspective view of a vehicle depicting a location of ducting in accordance with the present disclosure.
Figure 2:
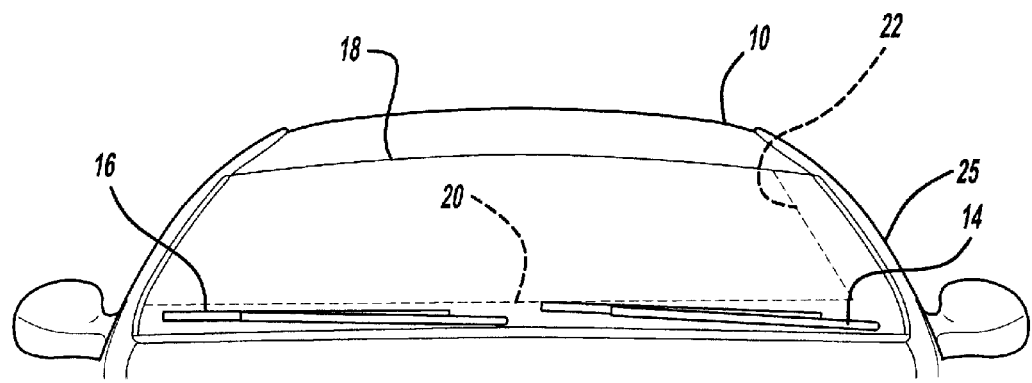
FIG. 2 is a front view of a vehicle depicting a location of ducting relative to windshield wipers in accordance with the present disclosure.

Example embodiments will now be described more fully with reference to FIGS. 1-7 of the accompanying drawings. FIG. 1 is a perspective view of a vehicle 10, such as an automobile, depicting a location of wiper blades 14, 16 in a low position 12. Low position 12 may be a horizontal or approximately horizontal low park position when blades 14, 16 are turned off and not operating or a maximum pivot, low operating position when blades 14, 16 are turned on or operating. Each of driver wiper 14 and passenger wiper 16, may be biased toward and rest against an exterior surface of windshield 18. When in position 12, driver side wiper 14 may reside within an approximately horizontal or horizontal zone 20, which may be a heated zone of windshield 18. Moreover, wiper 14 may pass within an approximately vertical or vertical zone 22, which may also be a heated zone of windshield 18. Zones 20, 22 may be heated from an interior surface of windshield 18, as will be further described later.

Figure 3:
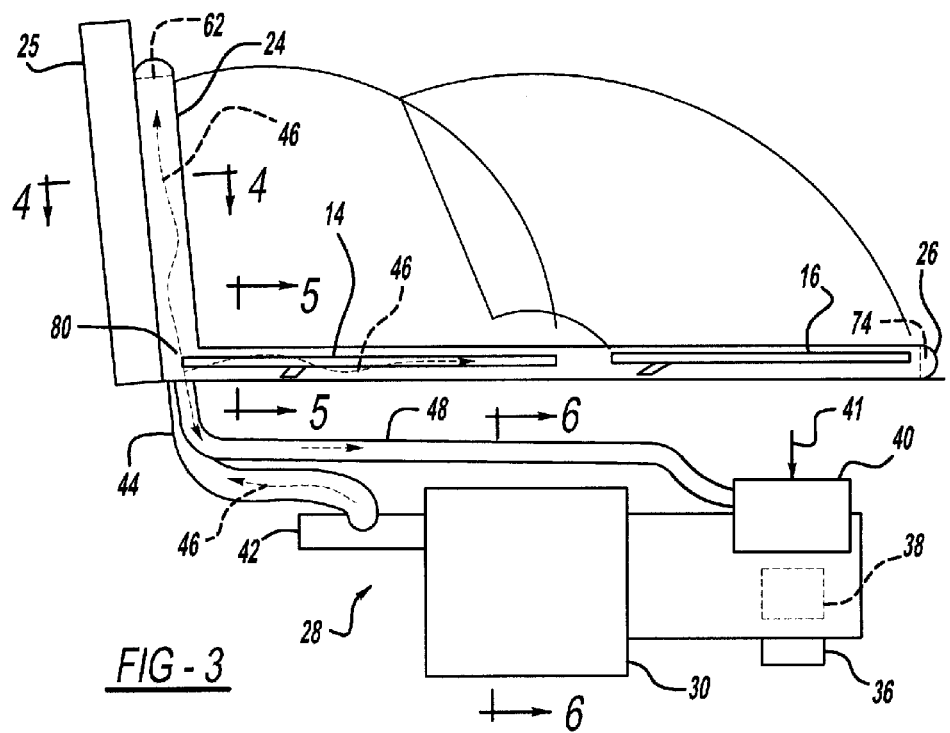
FIG. 3 is a view through a windshield from an interior of a vehicle depicting a location of ducting on an interior of the windshield in accordance with the present disclosure.

With reference now including FIG. 3, heated zones 20, 22 of windshield 18 become heated by ductwork inside a vehicle passenger compartment that is connected to a heating, ventilating and air conditioning ("HVAC") system of vehicle 10. An approximately vertical or vertical duct 24, hereinafter referred to as "vertical duct" and an approximately horizontal or horizontal duct 26, hereinafter referred to as "horizontal duct" may be fluidly connected to HVAC system 28 to deliver warmed and conditioned air through vertical duct 24 and horizontal duct 26. With reference including FIG. 6, HVAC system 28 may employ an external case 30 within which an evaporator 32, a heater core 34, a motor 36, and a fan 38 may reside. At fresh/re-circulating inlet 40, air 41 may enter due to a drawing force of rotating fan 38 which is turned by electric motor 36. Air 41 may then be forced into foot duct 42, for example, and into feeder duct 44 as conditioned air 46. Foot duct 42 is being referred to as such, although another duct may be suitable. Feeder duct 44 may be an HVAC case exit duct, such that air 46 may exit and be directed into vertical duct 24 and horizontal duct 26. Upon passing through one or both of vertical duct 24 and horizontal duct 26, air 46 then is directed back to HVAC case 30 where it is re-conditioned and/or warmed and again directed out of HVAC case 30. FIGS. 3 and 6 depict one arrangement of evaporator 32, heater core 34, motor 36, duct feeder pipe 44 and return air duct 48 although other arrangements are conceivable. Regardless, air 46 returning to HVAC case 30 may be returned to HVAC case 30 to pass through evaporator 32 and heater core 34 as required by an operator of a vehicle using HVAC controls in an interior compartment of a vehicle 10.

Figure 4:
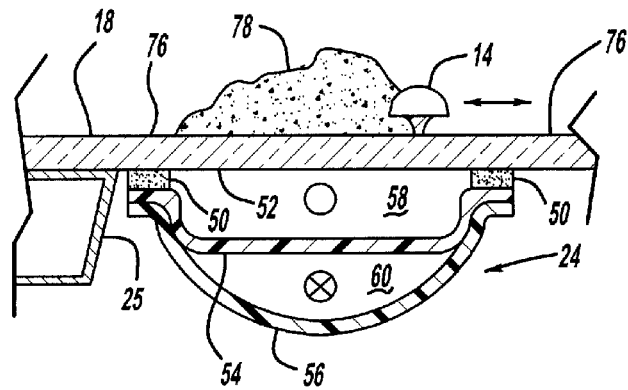
FIG. 4 is a cross-sectional view of a windshield and adjacent ducting in accordance with the present disclosure.

Continuing with FIGS. 3 and 4, details of vertical duct 24 will be presented. Vertical duct 24 may be located against an interior surface 52 windshield 18 such that a seal 50 is adhered to an interior surface 52 of windshield 18. Seal 50 may prevent the escape of air between windshield 18 and an interior wall 54 of vertical duct 24. Interior wall 54 and an exterior wall 56 form part of vertical duct 24. Interior wall 54 may be called such because it is close to an interior surface 52 of windshield 18; similarly, exterior wall 56 may be called such because it is farther from interior surface 52 of windshield 18 than interior wall 54. Interior wall 54 may be formed to adhere to seals 50 and define an interior air passageway 58 between interior wall 54 and interior surface 52 of windshield 18. Exterior wall 56 may be formed to adhere to interior wall 54 and define an exterior air passageway 60 with interior wall 54. Thus, vertical duct 24, in conjunction with interior surface of windshield 18, defines two flow paths to direct air from and to HVAC case 30. More specifically, air passage 58 is defined between interior surface 52 and interior wall 54 and is first to receive warmed air from HVAC case 30 from air conditioned by evaporator 32 and warmed by heater core 34. Upon air 46 passing through air passageway 58 against interior surface 52 of windshield 18, air warms windshield 18 and reaches an end 62 of interior wall 54 of vertical duct 24 and flows around end 62 and into air passage 60. At end 62 of vertical duct 24, a chamber may exist within which air is directed into exterior passageway 60 at 180 degrees in the opposite direction as in air passage 58. Once in exterior passageway 60, air 46 is directed back to return air duct 48 so that air 46 may be delivered to HVAC case 30, where it may again be conditioned and warmed. Vertical duct 24 may reside beside an A-pillar 25 of a driver side of vehicle 10 such that vertical duct 24 may be parallel to or approximately parallel to vertical duct 24.

FIG. 4 depicts a cross-section of vertical duct 24. More specifically, when wiper blade 14 is in an upright or nearly vertical position, such as when wiper 14 is a maximum pivot point when operating, as depicted in FIG. 4, an unobstructed path upon exterior surface 76 of windshield 18 will be provided by operation of vertical duct 24. More specifically, exterior surface 76 will be unobstructed by accumulated snow and ice 78. Because vertical duct 24 via interior passageway 58 passes warmed air over an interior surface 52 of windshield 18, by conduction, heat passes through a thickness of windshield 18 to an exterior surface 76 of windshield 18 and melts any accumulated snow and ice 78 that may exist and may prevent any future accumulation of snow and ice.

With reference to FIG. 5, air 46 may be delivered into horizontal duct 26, which may be located against windshield 18 such that seals 64 are adhered to an interior surface 52 of windshield 18. An interior wall 66, an exterior wall 68, and interior surface of windshield 18 may form air passageways within horizontal duct 26. More specifically, interior wall 66 may be formed with flanges to adhere to seal 64 and define an interior air passageway 70 between interior wall 66 and interior surface 52 of windshield 18. Exterior wall 68 may be formed with flanges to adhere to flanges of interior wall 66 such that an exterior air passageway 72 is formed between interior wall 66 and exterior wall 68. Thus, horizontal duct 26, in conjunction with interior surface 52 of windshield 18, defines two flow paths to direct air relative to HVAC case 30. More specifically, air passageway 70 is defined between interior surface 52 of windshield 18 and interior wall 66 and is an interior passageway of horizontal duct 24 that receives warmed air from HVAC case 30 from air conditioned by evaporator 32 and warmed by heater core 34. Upon air 46 passing through air passageway 70 against interior surface 52 of windshield 18, air reaches an end 74 of interior wall 66 of horizontal duct 26 and flows around end 74 and into air passage 72. Like duct 24, a chamber may be formed beside end 74, at an end of duct 26, such that air is turned or directed 180 degrees in the opposite direction as air in air passageway 70. Thus, air in air passageway 70 and air passageway 72 flows in opposite directions and air 46 within air passageway 72 is returned to return air duct 48 so that air 46 may be delivered into HVAC case 30, where it may again be conditioned.

FIG. 7 depicts an enlarged view of manifold 80, which as depicted in FIG. 1, facilitates a juncture of vertical duct 24 and horizontal duct 26. Manifold 80 may be an air distributing and blending device that may receive air 46 from feeder duct 44 connected to HVAC case 30. More specifically, an inlet 88 at an HVAC branch 82 of manifold 80 may receive air 46 from feeder duct 44. Upon air 46 being received at branch 82, air 46 may subsequently be divided such that a portion flows to each of vertical branch 84 and horizontal branch 86. Thus, air 46 is depicted as exiting vertical branch 84 at an outlet 90 en route to vertical duct 24 and exiting horizontal branch 86 at an outlet 92 en route to horizontal duct 26. Because manifold 80 is a dual direction flow device, manifold 80 may receive air 46 returned from vertical duct 24 at a vertical branch inlet 94 and may receive air 46 at a horizontal branch inlet 96. Air 46 received at inlets 94, 96 is blended together and then exits manifold 80 at a manifold outlet 98, which fluidly connects to return air duct 48. An internal manifold wall 100 separates airflow directions within manifold 80. That is, internal manifold wall 100 separates air flowing to each of vertical and horizontal ducts 24, 26 from air flowing from each of vertical and horizontal ducts 24, 26. Manifold 80 may be a molded, one piece part and connect to vertical duct 24, horizontal duct 26, feeder duct 44 and return air duct 48 by any method known by one skilled in the art, such as by clamping, gluing, press fit, etc.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. Moreover, the terms "vertical," "horizontal," "approximately vertical," and "approximately horizontal" are meant to convey locations or positions relative to a surface of the Earth. Still yet, terms indicating "degrees" with regard to airflow, such as "180 degrees" may be other angular directions, depending upon the direction of airflow actually required.

What is claimed is:

1. An apparatus comprising:
   an HVAC case having an exit air duct and a return air duct;
   a windshield having an interior surface; and
   an approximately vertical duct comprising:
      a first approximately vertical wall arranged next to the windshield and defining an approximately vertical interior passageway with the interior surface of the windshield;
      a second approximately vertical wall arranged next to the first approximately vertical wall and defining an approximately vertical exterior passageway with the first approximately vertical wall, wherein the approximately vertical interior passageway receives air from the exit air duct and the approximately vertical exterior passageway delivers air to the return air duct; and
a horizontal duct arranged next to the windshield connected to the exit air duct and the return air duct.

2. The apparatus of claim 1, wherein the approximately vertical duct defines an end chamber where flowing air reverses direction 180 degrees.

3. The apparatus of claim 1, further comprising:
the horizontal duct comprising:
a first horizontal wall arranged next to the windshield and defining a horizontal interior passageway with the interior surface of the windshield; and
a second horizontal wall arranged next to the first horizontal wall and defining a horizontal exterior passageway with the first horizontal wall, wherein the horizontal interior passageway receives air from the exit air duct and the horizontal exterior passageway delivers air to the return air duct.

4. The apparatus of claim 3, wherein the horizontal duct defines an end chamber where flowing air reverses direction 180 degrees.

5. The apparatus of claim 4, further comprising:
an A-pillar, wherein the approximately vertical duct defines a heated vertical zone of the windshield that is completely beside the A-pillar.

6. The apparatus of claim 5, further comprising:
a manifold, wherein the manifold divides air from the HVAC case into the approximately vertical duct and the horizontal duct.

7. The apparatus of claim 6, wherein the manifold combines air from the approximately vertical duct and the horizontal duct before delivering the air to the return air duct.

8. An apparatus comprising:
an HVAC case having an exit air duct and an inlet air duct;
a windshield having an interior surface;
an approximately vertical duct comprising:
a first approximately vertical wall arranged next to the windshield and defining a first approximately vertical interior passageway with the interior surface of the windshield; and
a second approximately vertical wall arranged next to the first approximately vertical wall and defining a first approximately vertical exterior passageway with the first wall, wherein the interior passageway receives air from the exit air duct and the first approximately vertical exterior passageway delivers air to the return air duct;
a horizontal duct comprising:
a first horizontal wall arranged next to the windshield and defining a horizontal interior passageway with the interior surface of the windshield; and
a second horizontal wall arranged next to the first horizontal wall and defining a horizontal exterior passageway with the first horizontal wall, wherein the horizontal interior passageway receives air from the exit air duct and the horizontal exterior passageway delivers air to the return air duct; and
a manifold that defines a vertical branch and a horizontal branch, the vertical branch connecting to the approximately vertical duct and the horizontal branch connecting to the horizontal duct.

9. The apparatus of claim 8, wherein the manifold further defines a first chamber in which air moves away from the HVAC case, and a second chamber in which air moves toward the HVAC case.

10. The apparatus of claim 9, wherein the first chamber of the manifold directs air into the approximately vertical duct and the horizontal duct.

11. The apparatus of claim 10, wherein:
the approximately vertical duct defines an end chamber where flowing air reverses direction 180 degrees, and
the horizontal duct defines an end chamber where flowing air reverses direction 180 degrees.

12. The apparatus of claim 11, wherein:
the second approximately vertical wall and the first approximately vertical wall are connected together along parallel longitudinal edges; and
the second horizontal wall and the first horizontal wall are connected together along parallel longitudinal edges.

13. An apparatus comprising:
an HVAC case having an exit air duct and an inlet air duct;
a windshield having an interior surface;
a first air duct comprising:
a first air duct interior longitudinal wall arranged next to the windshield and defining a first air duct interior passageway with the interior surface of the windshield; and
a first air duct exterior longitudinal wall arranged in part against the first air duct interior longitudinal wall and defining a first air duct exterior passageway;
a second air duct comprising:
a second air duct interior longitudinal wall arranged next to the windshield and defining a second air duct interior passageway with the interior surface of the windshield; and
a second air duct exterior longitudinal wall arranged in part against the second air duct interior longitudinal wall and defining a second air duct exterior passageway with the second air duct interior longitudinal wall; and
an air manifold that defines a first chamber and a second chamber, the first chamber directing air into the first air duct interior passageway and the second air duct interior passageway and receiving air from the exit air duct, the second chamber receiving air from first air duct exterior passageway and the second air duct exterior passageway and directing air into the inlet air duct.

14. The apparatus of claim 13, wherein:
the first air duct defines an end chamber where flowing air reverses direction 180 degrees, and
the second air duct defines an end chamber where flowing air reverses direction 180 degrees.

15. The apparatus of claim 14, wherein the first air duct and the second air duct are mounted to the windshield.

16. The apparatus of claim 15, wherein:
the first air duct interior longitudinal wall and the first air duct exterior longitudinal wall are connected together along parallel longitudinal edges; and
the second air duct interior longitudinal wall and the second air duct exterior longitudinal wall are connected together along parallel longitudinal edges.

17. The apparatus of claim 16, wherein the first air duct is located parallel to a body support structure within which the windshield is secured.

18. The apparatus of claim 17, further comprising:
a windshield wiper, wherein the first air duct interior passageway warms an area of the windshield coincident with a maximum non-park position of the windshield wiper.

19. The apparatus of claim 18, wherein the second air duct interior passageway warms an area of the windshield coincident with a park position of the windshield wiper.

* * * * *